July 11, 1933.                F. V. MALOON                1,917,768
                              CABLE JOINT
                           Filed Oct. 12, 1927
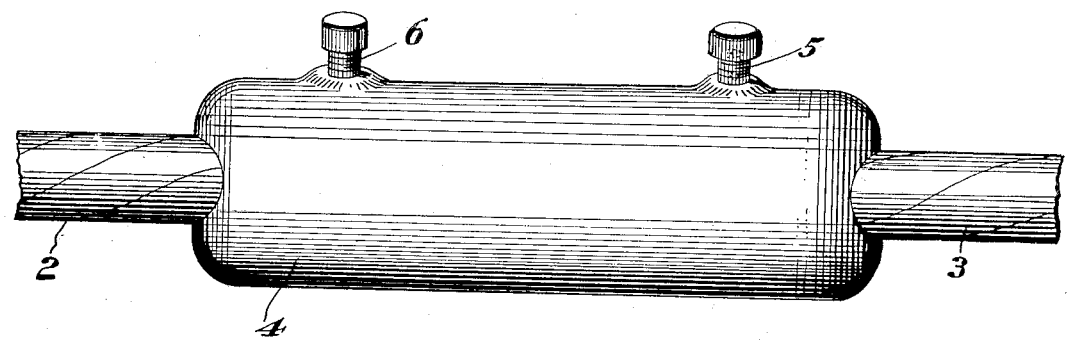
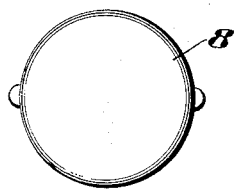
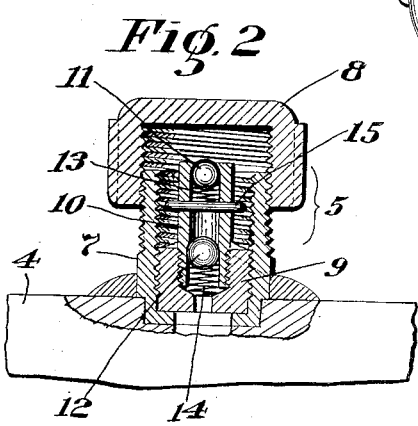
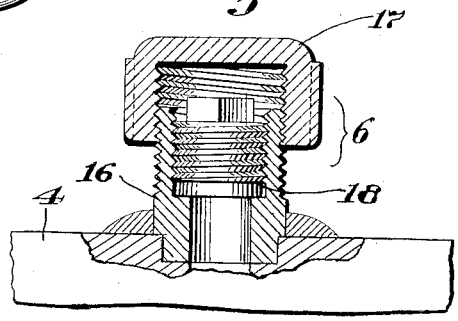
INVENTOR:
Frederick V. Maloon,
BY
his ATTORNEY Patented July 11, 1933

1,917,768

UNITED STATES PATENT OFFICE

FREDERICK V. MALOON, OF BOSTON, MASSACHUSETTS, ASSIGNOR TO JAMES SUGDEN COMPANY, OF BOSTON, MASSACHUSETTS, A CORPORATION OF MASSACHUSETTS

CABLE JOINT

Application filed October 12, 1927. Serial No. 225,812.

This invention relates to the splices which are necessarily made in joining one cable to another, and is more especially concerned with such splices or joints in underground cables.

The usual underground cable used for the purpose of transmitting electricity has a lead sheath or armor which is insulated from the conductors in the cable and serves as a protective covering for both the conductors and their insulation. When one cable is spliced to another the sheath is cut away, the individual conductors of one cable are spliced to those of the other, these spliced sections are wound with insulating tape, and the entire splice is then enclosed in a lead sleeve which is secured at its opposite ends to the sheath by wiped joints. It is a common practice then to fill this sleeve with transil oil, and in order to keep the sleeve filled it has been a common practice to connect to the sheath a container holding a supply of oil and to leave the container so connected for a considerable period of time, usually several months.
The present invention aims to improve the apparatus used for protecting joints or splices with a view to reducing the time and labor involved in making such splices, and producing a better protection for the spliced conductors.

The nature of the invention will be readily understood from the following description when read in connection with the accompanying drawing, and the novel features will be particularly pointed out in the appended claims.

In the drawing,

Figure 1 is a side elevation of a completed splice or joint;

Fig. 2 is a cross-sectional view showing a portion of the outer sleeve at the joint, and also illustrating the construction of a filling plug which embodies one feature of the present invention;

Fig. 3 is a view similar to Fig. 2 showing the internal construction of a vent plug with which the sleeve is provided; and Fig. 4 is a plan view of the cap used on either the vent plug or filling plug.

According to this invention the operations of splicing of the indivdual conductors, the winding of them with tape, and a connection of an insulating sleeve surrounding them to the lead sheaths of the two cables, may all be performed in the usual manner. In the drawing the lead sheaths of two cables are indicated at 2 and 3, respectively, and the lead sleeve which connects them and encloses the spliced sections of the conductors is shown at 4. Mounted in the upper side of this sleeve is a filling plug 5 and a vent plug 6, the detailed constructions of these two plugs being clearly shown in Figs. 2 and 3, respectively.

Referring to Fig. 2 it will be seen that the filling plug 5 comprises a body 7 which is sweated into the sleeve 4. This body is threaded externally to receive a cap 8 and internally to receive a plug 9. A filling tube or stem 10 is threaded into the plug 9 and is also soldered to it and is provided with two seats, one above the other, to receive balls 11 and 12, respectively, the upper ball being smaller in diameter than the lower ball. Springs 13 and 14, respectively, act on these balls to hold them normally in their seats, the upper spring resting on a pin 15 which extends transversely through the tube 10, while the lower spring 14 rests on the bottom of the bore in the plug 9 into which the stem 10 is threaded. These two balls with their seats form inwardly opening check valves arranged in series.

The vent plug 6 comprises a body 16 much like the body 7 and secured permanently to the sleeve 4 in the same manner. This body also is threaded externally to receive a closure cap 17 exactly like the cap 8, and is threaded internally to receive a screw threaded plug 18.

According to the preferred practice of filling the sleeve after the splicing operations have been completed, hot insulating compound of any suitable character, such for example, as grease which is sufficiently stiff not to flow at normal temperatures but becomes fluid upon heating somewhat above normal, is poured into the sleeve through either the vent plug or filling plug, the caps of these plugs at this time being removed and the inner plugs 9 and 18 also being removed.

When the sleeve has been substantially filled the plug 18 is threaded securely into the body 16 so as to close the vent. The plug 9 with the filling stem and check valves carried thereby is then threaded into the vent plug 7, as shown in Fig. 2. A grease gun is next attached to the filling stem 10 and grease or other insulating compound used in the joint is forced into this sleeve under pressure of, say, 30 or 40 pounds. If there are any pin holes in the sleeve or the wiped joints their presnce will be disclosed immediately and they can be repaired. Assuming that no defects of this character are disclosed, the grease gun is removed and the caps 8 and 17 are threaded on the plug bodies 7 and 16, respectively. Prior to threading on the cap 17 the pressure may be relieved, if desired, by backing up the internal plug 18.

The joint is allowed to set in this condition for approximately twenty-four hours to cool off and allow the insulating compound to settle. This will result in the air collecting in the upper part of the sleeve. After the joint has set for approximately this period named, the caps and plug 18 are removed, the grease gun is again connected with the filling stem 10, and grease or other insulating compound is forced into the sleeve until it comes up through the vent 6. This grease will carry air with it which can be seen as small bubbles in the grease. The operation of forcing the grease through the sleeve in this manner is continued until it no longer shows air bubbles when the plug 18 is screwed firmly in place and the cap 17 screwed on. Additional grease is then forced into the sleeve until a pressure of 30 or 40 pounds is built up in it, then the grease gun is removed and the cap 8 is threaded in place, thus sealing the sleeve and completing the joint.

The provision of the vent and filling plugs in the sleeve greatly facilitates the proper filing of it with insulating compound, and these parts, together with the method above described, materially reduce the time and labor required in completing a joint, while at the same time providing a construction in which the liability of further trouble is practically eliminated. The use of a stiff grease or insulating compound, such as that above described, is also of advantage since it will not work through the cables to any substantial degree and thus leave voids in the joint.

While I have herein shown and described the preferred form of apparatus provided by this invention and the best mode of procedure of which I am at present aware, it will be understood that the invention may be embodied in other forms of apparatus and that variations may be made in the procedure followed without departing from the spirit or scope of the invention.

Having thus described my invention, what I desire to claim as new is:

1. A plug for a cable joint sleeve comprising a body adapted to be secured to said sleeve, an internal plug removably mounted in said body, a filling stem secured in and projecting from said internal plug, and two ball check valves mounted in series in said stem and both controlling the passage through said stem.

2. A plug for a cable joint sleeve comprising a body adapted to be secured to said sleeve, said body being threaded both internally and externally and having a seat therein, an internal plug threaded in said body against said seat, and a check valve mounted on said internal plug, said valve including a hollow stem with a valve seat therein and a movable valve element for engaging said seat.

3. A plug for a cable joint sleeve comprising a body adapted to be secured to said sleeve, an internal plug removably mounted in said body, a filling stem secured in and projecting from said internal plug, said stem having a filling passage therethrough with two ball seats therein to take balls of different diameters, and springs for holding said balls in their seats, whereby said balls constitute check valves arranged in series.

FREDERICK V. MALOON.